US012693960B1

(12) United States Patent
Vanga et al.

(10) Patent No.: US 12,693,960 B1
(45) Date of Patent: Jul. 28, 2026

(54) DYNAMIC DATA LOG MINING FOR ISSUE RESOLUTION

(71) Applicant: o9 Solutions, Inc., Dallas, TX (US)

(72) Inventors: Srinath Goud Vanga, San Jose, CA (US); Koustuv Chatterjee, Gilbert, AZ (US)

(73) Assignee: o9 Solutions, Inc., Dallas, TX (US)

( * ) Notice: Subject to any disclaimer, the term of this patent is extended or adjusted under 35 U.S.C. 154(b) by 0 days.

(21) Appl. No.: 19/098,666

(22) Filed: Apr. 2, 2025

(51) Int. Cl.
*G06F 9/44* (2018.01)
*G06F 11/3604* (2025.01)
*G06F 11/3668* (2025.01)

(52) U.S. Cl.
CPC ...... *G06F 11/3612* (2013.01); *G06F 11/3692* (2013.01)

(58) Field of Classification Search
CPC .......................... G06F 11/3612; G06F 11/3692
See application file for complete search history.

(56) References Cited

U.S. PATENT DOCUMENTS

2017/0083585 A1* 3/2017 Chen .................... G06F 11/3409
2018/0013612 A1* 1/2018 Shuster .............. G06F 16/1805

2019/0073426 A1* 3/2019 Balduccini .......... G06F 16/9535
2019/0251184 A1* 8/2019 Shan ...................... G06N 3/045
2020/0183805 A1* 6/2020 Togawa .............. G06F 11/3476
2020/0257679 A1* 8/2020 Sheinin .................... G06N 3/08

* cited by examiner

*Primary Examiner* — Hang Pan
(74) *Attorney, Agent, or Firm* — Schwegman Lundberg & Woessner, P.A.

(57) ABSTRACT

A computer-implemented system and method for processing log data in a multi-tenant software environment processes logs from distributed software modules through an automated pipeline. The system implements developer-configured event definitions to identify discrete events using start and end message pairs, while extracting reference text patterns to correlate logs across different modules. A hybrid database structure combines database and vector database capabilities to maintain both filtered data and complete textual context, enabling semantic processing of natural language queries. The system performs automated cross-module correlation through language model processing that extracts structured information based on developer-specified parameters. Two-stage query processing uses language embeddings for semantic matching and automated database query generation to provide contextualized responses. The system maintains tenant isolation through boundary validation while enabling resource optimization across distributed components, improving log processing efficiency and reducing issue resolution time in complex multi-tenant environments.

20 Claims, 5 Drawing Sheets

*400*

405

RECEIVE LOG DATA

410

PROCESS LOG DATA

415

CORRELATE EVENTS

420

PROCESS NATURAL LANGUAGE QUERY

DYNAMIC DATA LOG MINING FOR ISSUE RESOLUTION

TECHNICAL FIELD

Embodiments described herein generally relate to computer software diagnostics and problem detection and, in some embodiments, more specifically to a software log data mining platform for computing system issue resolution.

BACKGROUND

Software platforms may comprise several components with each component serving a different user type. The components are interconnected but every function of the software platform may not be included in all the components. In a complex software platform, each component may be owned by different developers who improve and maintain the component. Each of the components generate a plethora of logs that keep inform users about operation of the underlying components. The logs are used to diagnose issues faced by users and may be used by customer service executives to identify service issues. An owner of the software platform may wish to keep stakeholders such as users, technical support personnel, and management informed of system availability and performance metrics.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
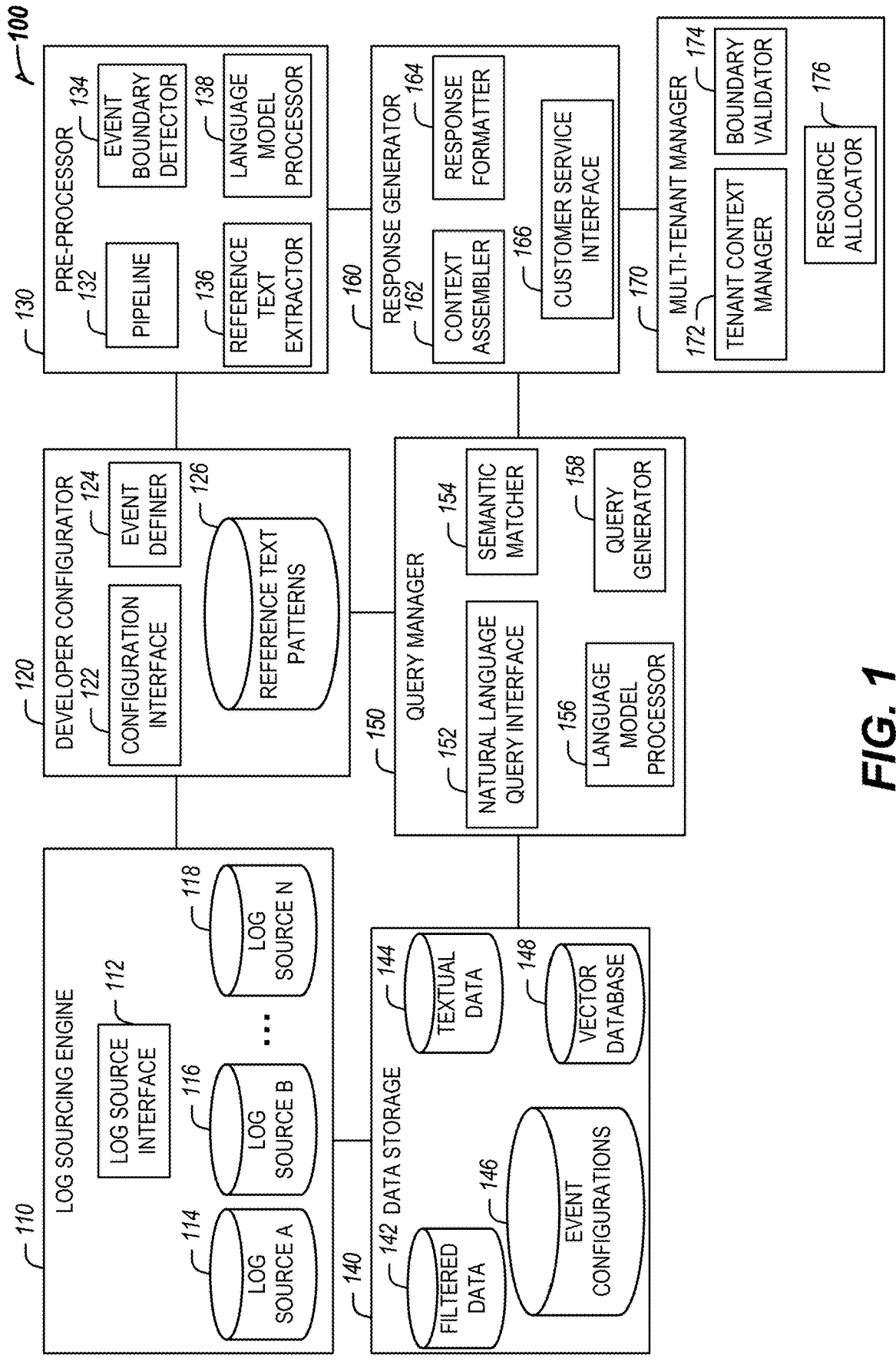
FIG. 1 is a block diagram of an example of a system for dynamic data log mining for issue resolution, according to an embodiment.

Given the dynamic nature of software development and feature implementation, keeping abreast about new developments and changes that have an impact on computing service delivery is a difficult task, leads to several computing hardware inefficiencies, and increases time to resolution of computing system errors. The systems and techniques discussed herein allows for effective log navigation and developer changes to accurately reflected in system configuration tracking for efficient issue resolution.

The challenges presented by these technical problems are exacerbated when multiple computing system tenants are involved because it adds additional complexity that must be addressed by the computing system dynamically including identification of the appropriate logs for an error and understanding context of an error for a given tenant in order effectively address the computing system issue.

In conventional issue resolution data mining systems, support tickets contain details about the computing environment and a time frame covering the start time and date for when the issue occurred. Using that information, a customer service representative has to locate relevant logs and then try to understand the sequence of events that caused the computing system issue. If they cannot resolve the issue with the available information, the issue is escalated to a next level of computing system support. If the subsequent levels of support are unable to find the correct log data or fail to understand the sequence of events, the issue is escalated to a developer. This process can take several days causing frustration for both an end-user and customer service representative as the failure of the computing system continues through the escalation process.

Due to the dynamic nature of the software development process and natural evolution of computing products, the content and format of log messages tends to change over time. Moreover, not all log content is relevant to the current computing system issue. The overwhelming quantity of available log data may result in an extended search for a few pieces of relevant log data in a sea of thousands of available log entries.

Conventional solutions for issue resolution data mining systems pose log volume and complexity challenges including difficulty managing and analyzing a plethora of logs generated by multiple interconnected software components, finding relevant information among vast amounts of log data, and complexity of correlating logs across different components and systems. The conventional solutions pose issues in multi-tenant environments including complications in managing and contextualizing logs across different tenants, difficulty for customer service representatives that use mined data to troubleshoot computing issues for multiple tenants simultaneously, and challenges in maintaining proper data isolation and context between tenants.

Conventional log data mining solutions cause knowledge transfer and communication problems such as difficulty keeping customer service representatives updated about system changes due to the dynamic nature of software development, inefficient communication between developers and customer service teams, and a challenge of maintaining consistent knowledge transfer as software evolves. Issue resolution delays may include time-consuming escalation processes that can take several days to complete, inefficiencies in routing issues to appropriate technical teams, and challenges in quickly identifying root causes from log data. Log message evolution challenges in conventional systems include problems caused by log messages changing over time due to software evolution, difficulty maintaining consistent log interpretation as systems are updated, and a challenge of tracking and understanding log message changes across system versions. Data integration problems of conventional solutions include complexity in combining logs from several different components to provide complete context, challenges in correlating events across different system components (e.g., ML algorithms, structured query language (SQL) queries, cluster operations, etc.), and difficulty in maintaining relationships between independently stored logs.

The systems and techniques discussed herein solve the technical problems described above by allowing for asynchronous collaboration between developer actions and customer service representative activities to effectively communicate the format, schema, context, and other relevant data regarding the configuration of log messages to present the customer service representative with relevant log data without having to search through irrelevant logs and log messages.

Definitions

As used herein, a software component is a part of a bigger software system, a component is logically separate from other components but in some cases, components can be closely related. As used herein, large language models (LLMs) are machine learning (ML) models that are used for text processing. There are several kinds of language models and different vendors, both closed source and open source. Popular examples include, but are not limited to OPENAI GPT-4, ANTHROPIC CLAUDE and GOOGLE gemini. As used herein, function calling is a feature of recent LLMs, that facilitates structured data extraction from a piece of text. As used herein, embeddings are a mathematical representation of a textual information, facilitating semantic comparison between two pieces of textual information. As used herein, a vector database is a special type of database which supports fast comparison of texts using their embedding representations. Vector databases can store billions of records and can process queries.

The systems and techniques discussed herein enable developers to extend events in a log as a computing platform evolves over time and enables deletion and updating of event configurations for logs causing updates to diagnostic data collection processes and diagnostic data delivery, asynchronous exchange of log processing knowledge between developer systems and customer service systems, automated log processing and enablement of chatbot powered interfaces is customer service user interface, and, contextualized knowledge and log processing in multi-tenant environments.

Processing a plethora of logs from multiple components in real-time, maintaining chronological ordering across distributed log sources, and efficient storage and retrieval of both filtered and complete textual data are challenges presented in conventional log management. Log processing and data mining is improved by processing and analyzing software platform logs across multiple components and implementing automated log processing to extract relevant information from large volumes of log data. Sharded processing pipelines are implemented to distribute log processing load, stream processing capabilities are added with buffering mechanisms, and time-series optimized storage structures are used for chronological data to address log data volume and velocity challenges.

Natural language processing (NLP) and ML is improved by utilizing LLMs for text processing and information extraction, employing language embeddings for semantic matching of queries, and incorporating function calling features of language models for structured data extraction. Database systems and information retrieval is improved by implementing database (e.g., SQL, etc.) storage for processed log data, using vector databases for semantic text comparison and query processing, and enabling contextual processing for multi-tenant data environments.

Asynchronous collaboration systems are implemented between developer data systems and customer service data systems and declarative configuration interfaces for system customization are enabled for software architectures and system designs that contain distributed software systems with multiple interconnected components. The solution described herein creates an intelligent log mining platform that combines these technological improvements to improve computing system issue resolution in multi-tenant software environments.

Customer service knowledge management problems are solved using technical solutions including declarative configuration the enables developers to define specific events and log patterns, implementation of an asynchronous collaboration platform between developer data systems and customer service data systems, implementation of vent-based configuration system that processes logs using developer-defined parameters and filters, and table-based storage with descriptions of what information is stored and which events it collects data.

Correlating logs across database queries, ML algorithms, cluster operations, etc., maintaining relationship consistency between independently stored logs, and processing varying log formats from different components are challenges in multi-tenant environments. Multi-tenant context management issues are solved using technical solutions such as configurable filters that can include tenant-specific information (e.g., algorithm name, tenant name, etc. as filters), contextualized knowledge processing specific to each tenant environment, and a database storage system that maintains tenant-specific log data and context. Distributed tracing mechanisms are used to track cross-component relationships, checksums and validation mechanisms are added for log correlation accuracy, and reference text processing is enhanced with format-specific parsers to address multi-tenant challenges.

In a multi-tenant environment, challenges such as maintaining strict data boundaries between tenants, processing tenant-specific context while sharing common resources, and ensuring accurate tenant identification in cross-component scenarios make it difficult to isolate data among tenants. To address these challenges, tenant-specific encryption is used for stored logs, tenant context validation layers are in the processing pipeline, and the filter system is enhanced with tenant-specific boundary checks.

Log analysis and resolution delays are addressed by technical solutions such as a chatbot interface for customer service representatives to interact with the platform, semantic matching using language embeddings to match questions to relevant events, relevancy table selections made using language models, automated query (e.g., SQL query, etc.) generation based on extracted filters, and integration with LLMs for query processing. Ensuring accurate extraction of filters from natural language queries, maintaining precision in semantic matching across different contexts, and processing complex queries spanning multiple event types are some of the challenges in maintaining accurate semantic analysis. Confidence scoring is used for language model extractions, validation layers are added for semantic matching results, and vector databases are enhanced with context-aware embedding models to address these issues with semantic analysis accuracy.

Log evolution and maintenance challenges are addressed by technical solutions including a developer configuration system that can be extended, updated, and deleted as the platform evolves, event configurations that are automatically processed and updated when log processing knowledge changes, and storage of plain text logs to retain relevant information for posterity. Cross-component log correlation problems are addressed with technical solutions including a log pre-processing pipeline that identifies start and end messages in chronological order, event-based processing that treats each combination of start and end message as a discrete event, a reference text filtering system to process logs within events, LLM integration for extracting relevant information based on function specifications, and a unified storage system that combines logs from different components into a single coherent view.

These solutions are implemented through a two-part architecture. A log pre-processing architecture uses multiple log sources that feed into a central processing system, developer configurations that drive processing logic, separate storage for filter data and textual data, and a database (e.g., SQL, etc.) for structured storage. A query processing architecture includes event configuration management, two-stage language model processing for query understanding and answer generation, object-relational mapping (ORM) model application programming interface (API) for database interaction, and an integration layer for combining relevant logs and contextual information.

Managing storage of complete historical logs for posterity, processing evolving log formats over time, and maintaining query performance across historical data are challenges in conventional log analysis systems. To address these issues, a tiered storage architecture is used for historical data, version tracking is added for log format changes, and the database is enhanced with time-based partitioning strategies.

These solutions integrate with existing architecture while adding new technical capabilities to handle the specific challenges of processing log data efficiently and accurately across a distributed, multi-tenant environment.

Additional technical issues are addressed by the systems and techniques discussed herein including real-time log analysis scalability. The architecture for processing multiple log sources can solve scalability challenges in real-time log analysis by implementing a distributed processing approach to address bottlenecks in high-volume log streams across multiple components. Existing log pre-processing architecture is extended to implement stream processing capabilities. Distributed message queues are added between log sources and processing components to handle high-volume data. Existing database structure is enhanced with partitioning for improved query performance across large datasets.

Automated knowledge base management is improved by the ability to process and store structured log data to facilitate automatic knowledge base updates, and the combination of language models and developer configurations solves the challenge of maintaining accurate documentation automatically. Existing language model integration is leveraged to automatically generate and update documentation from processed logs. Developer configuration systems are extended to include metadata about system changes and impacts of the system changes. The "table\_description" and "column\_description" features are built upon to automatically maintain technical documentation.

Predictive issue detection is improved through semantic matching and language model integration that enables predictive identification of issues before they escalate and the ability to correlate events across components to detect patterns indicating potential future problems. Semantic matching is enhanced to identify patterns in historical event data. Existing language model integration is extended to analyze trends across multiple events. Cross-component correlation capabilities are built upon to detect anomaly patterns before they cause issues.

Cross-platform log standardization is enabled by a declarative configuration system to solve the problem of standardizing logs from different platforms and sources and the pre-processing pipeline addresses challenges in normalizing varied log formats. Developer configuration is expanded to include log format transformation rules. Reference text processing is enhanced to process multiple log formats. An existing "function\_spec" feature is leveraged to standardize data extraction across different platforms.

Automated root cause analysis is enabled by combining logs from several different components and correlating events to facilitate root cause analysis and language model integration solves the challenge of automatically identifying causal relationships between events. Event processing is extended to track causal relationships between events. Existing language model integration is enhanced to analyze event chains and identify root causes. Cross-component correlation capabilities are built upon to create dependency graphs.

Dynamic system documentation tracks log changes over time to solve the challenge of maintaining up-to-date system documentation and asynchronous collaboration features address the problem of keeping technical documentation synchronized with system changes. Existing event configuration is leveraged to automatically track and document system changes. Developer configuration is extended to include documentation generation rules. Asynchronous collaboration features are built upon to maintain synchronized documentation.

Intelligent load distribution is provided by enabling systems to understand event patterns to solve workload distribution challenges among customer service teams and contextual awareness of tenant-specific issues facilitates more efficient resource allocation. Chatbot interfaces are enhanced to include workload routing capabilities. Tenant-specific context understanding is leveraged to optimize resource allocation. Existing filters are built upon to track issue complexity and expertise requirements.

Historical pattern analysis is enabled through storage of plain text logs for posterity combined with structured data to enable sophisticated historical pattern analysis and event-based processing solves challenges in tracking issue evolution over time. Existing database structure is extended to include time-series analysis capabilities. Language model integration is enhanced to analyze long-term patterns in stored logs. Event-based processing is built upon to track issue evolution patterns.

These technical solutions integrate with the two main components of the architecture. The processing capabilities of the log pre-processing pipeline are enhanced with new features while maintaining the core event-based structure and the query processing system extends the language model integration and database interactions to support new capabilities. The log processing architecture is enhances to improves the fundamental way a computer system processes logs across distributed components. A pre-processing pipeline is implemented that transforms how log data is chronologically processed and correlated across different system components and more efficient computer memory usage (e.g., reduced memory hardware utilization, reduced power consumption, etc.) is created through structured event-based processing rather than traditional sequential log parsing.

Cross-component data integration advances computer functionality by implementing automated correlation of logs across different system components (e.g., SQL, ML algorithms, cluster operations, etc.), improves the ability of a computing system to maintain relationships between independently stored logs through event-based processing, and enhances database operations through specialized table structures that maintain both filtered data and complete textual context. Dynamic configuration improves how computer systems adapt to changes through automated event configuration generation from developer configurations, enhances computing system maintainability through declarative configurations that automatically update log processing behaviors, and implements technical improvements to how computer systems handle multi-tenant data isolation and context management.

Semantic processing advances computer functionality through integrated semantic matching using language embeddings for more efficient query processing, implements technical improvements to database querying through automated query generation based on semantic understanding, and enhances the ability of a computer system to process and correlate information through vector database implementation for semantic text comparison. The real-time processing pipeline improves the ability of a computer system to process multiple log sources simultaneously through a specialized pre-processing architecture, enhances system efficiency through automated filter extraction and structured data processing, and implements technical improvements to how computer systems handle chronological event processing and correlation.

These improvements focus on enhancing the fundamental operation of computer systems rather than simply using existing computer functionality to solve business problems. They modify how computers process, store, and analyze data, representing genuine technical advancements in computer functionality.

FIG. 1 is a block diagram of an example of a system for dynamic data log mining for issue resolution, according to an embodiment. The system 100 includes a log sourcing engine 110, a developer configurator 120, a pre-processor 130, data storage 140, a query manager 150, a response generator 160, and a multi-tenant manager 170.

The log sourcing engine 110 that includes a log source interface 112, a log source A 114, a log source B 116, and additional log sources N 118. The system architecture (100) implements a comprehensive log mining platform that processes data from multiple log sources (e.g., the log source A 114, the log source B 116, the log source N 118, etc.) which receive logs from distributed software components performing database operations, machine learning algorithms, cluster operations, etc. as directed by the log source interface 112.

The developer configurator 120 includes a configuration interface 122, and event definer 124, and reference text patterns 126. The configuration interface 122 enables developers to define events and reference text patterns through declarative configurations. These configurations are stored in the reference text patterns 126 and used to by the event definer 124 to generate event definitions that specify start and end messages for identifying discrete events.

The pre-processor 130 includes a pipeline 132, an event boundary detector 134, a reference text extractor 136, and a language model processor 138. The pipeline 132 processes incoming logs in conjunction with the event boundary detector 134 by detecting event boundaries based on the event definitions stored in the reference text patterns 126. The reference text extractor 136 identifies and extracts specified patterns from the logs, while the language model processor 138 performs structured information extraction based on developer-specified function parameters. The pipeline 132 architecture is configured for parallel processing of multiple log sources with maintained chronological ordering and works in conjunction with the event boundary detector 134 to implement specialized event boundary detection using start/end message pairs. The pipeline 132 is integrated with developer configurations for dynamic processing rule updates.

Table 1 illustrates an example developer configuration.

TABLE 1

```
{
    "reference_set": {
        "reference_texts": [
            "User Script Error:",
            "ModuleNotFoundError: No module named",
            "Reason: Container killed by YARN for exceeding memory
            limits.",
            "Ingestor Result",
            "Started executing plug-in instance",
            "Finished executing plug-in instance"
        ],
        "start_text": "Started executing plug-in instance",
        "end_text": "Finished executing plug-in instance"
    },
    "function_spec": {
        "name": "python_plugin_execution",
        "description": "Process logs.",
        "parameters": {
            "type": "object",
            "properties": {
                "PluginName": {
                    "type": "string",
                    "description": "Name of the plugin, usually mentioned
within 'Started executing plug-in instance'"
                }
            },
            "required": ["PluginName"]
        }
    },
    "table_name": "python_plugin_execution",
    "table_description": "Contains logs of python plugin instances and
where various errors occurred. Important information is the plugin
names and how long it took to run.",
    "column_description": {
        "PluginName": "The name of the plugin."
    }
}
```

The data storage 140 includes filtered data 142, textual data 144, event configurations 146, and a vector database. The data storage 140 may be one or more databases (e.g., a SQL database, etc.) that includes the filtered and structured event data 142 that is complemented by the textual data 144 that maintains complete contextual information. The event configurations 146 maintain the processed event definitions and their relationships. The unconventional configuration of the data storage 140 implements specialized table structures that combine filtered data with complete textual context, stores both structured event data and plain text logs to retain relevant information for posterity and integrates with vector database 148 capabilities to create a hybrid database structure for semantic comparison operations. The vector database 148 of the data storage 140 have a specialized configuration customized for fast semantic comparison of log-specific textual information. The vector database 148 are configured to handle billions of records while maintaining quick query processing and are integrated with traditional database tables for hybrid structured/semantic querying.

The query manager 150 includes a natural language query interface 152, a semantic matcher 154, a language model processor 156, and a query generator 158. When processing queries, the natural language query interface 152 receives requests from customer service representatives. The semantic matcher 154 uses language embeddings to identify relevant events, while the language model processor 156 performs two-stage processing to extract specific filters. The query generator 158 automatically creates database queries based on the semantic understanding provided by the semantic matcher 154.

The language models are configured for two-stage processing: first for event matching using the language model processor 138 of the pre-processor 130, then for detailed analysis by the language model processor 156 of the query manager 150. The unconventional language model implementation is integrated with function calling features for structured data extraction from logs and for automated filter extraction from natural language queries.

The response generator 160 includes a context assembler 162, a response formatter 164, and a customer service interface 166. The context assembler 162 combines relevant logs and event information. The response formatter 164 structures the information before presenting it through the customer service interface 166.

The multi-tenant manager 170 includes a tenant context manager 172, a boundary validator 174, and a resource allocator 176. The tenant context manager 172 maintains tenant context across the distributed system while the boundary validator 174 ensures proper data isolation. The resource allocator 176 manages system resources across different tenants and operations. Enhanced ORM model APIs are configured in the multi-tenant manager 170 to handle multi-tenant data isolation while maintaining cross-component relationships and works in conjunction with the query generator 158 to generate specialized queries based on semantic understanding integrated with an event-based processing system for contextual data retrieval specific to individual tenants.

The system 100 enables asynchronous collaboration between developers and customer service representatives by automatically processing logs based on developer configurations and providing contextualized responses through semantic matching and automated query generation. These configurations represent significant departures from conventional implementations, creating technical improvements in how the system 100 processes and analyzes data across distributed computing systems.

Specialized event-based data structures are used that transform raw logs into structured events with defined boundaries. Log data is dynamically reorganized by identifying and correlating start/end message pairs across distributed sources. Hybrid data structures are maintained combining filtered data 142 with textual data 144 including complete textual context for comprehensive processing. Log source ingestion is controlled through the configurable pipeline 132 that manages multiple input streams. Database operations are directed through automated query generation of the query generator 158 based on semantic understanding. Resource allocation is managed by the resource allocator 176 across distributed system 100 components through event-based processing controls.

Database storage structures are modified through automated table creation and management based on developer configurations. Memory allocation and resource usage is controlled through structured event processing rather than sequential parsing. Physical data partitioning and organization is implemented based on tenant boundaries and event types. Processing rules are dynamically updated through declarative configurations without system interruption. Execution flow is controlled across multiple components through automated event correlation. System resources are managed through tenant-specific boundary enforcement and context validation. Physical control over log processing sequences is implemented through chronological ordering mechanisms. Data flow is managed between different system components (e.g., SQL, ML algorithms, cluster operations, etc.). Information extraction and storage are controlled through automated filter processing and validation.

These implementations represent concrete manipulations of computer operations and data structures, causing tangible changes to system behavior and resource utilization beyond mere data analysis.

An unconventional event-based data structure is implemented by the data storage 140 that transforms how log data is processed and stored. A hybrid storage system is created combining the filtered data 142 with the textual data 144, enabling both efficient querying and comprehensive analysis. Innovative chronological processing with start/end message pairs is utilized by the event boundary detector 134 to maintain temporal relationships across distributed systems. A technically sophisticated solution is implemented for correlating logs across different system components (e.g., SQL, ML algorithms, cluster operations, etc.). Automated relationships are created between independently stored logs through novel event-based processing. The vector database 148 is utilized in combination with traditional databases (e.g., the filter data 142, the textual data 144, and event configurations 146) by the data storage 140 to enable semantic comparison while maintaining structured data relationships.

An unconventional declarative configuration system is used that automatically generates event configurations 146 and updates processing rules. A technical framework for asynchronous collaboration between developers and customer service representatives is created through automated log processing. A two-stage language model processing system is used for improved accuracy in query understanding and response generation by the response generator 160. Technical solutions are implemented in the multi-tenant manager 170 for maintaining data isolation while enabling shared resource utilization and tenant-specific context processing is created while maintaining system efficiency through automated filter extraction. Specialized table structures and processing pipelines are used to handle multi-tenant environments efficiently.

A combination of language embeddings and function calling features are used for accurate information extraction. Automated query generation is completed by the query generator 158 based on semantic understanding of natural language queries. The sophisticated pre-processing pipeline 132 handles multiple log sources while maintaining data relationships. The combination of these elements creates a technically innovative system that goes beyond traditional log processing approaches by solving the technical challenge of processing distributed logs across multiple components and tenants, implementing novel data structures and processing mechanisms that improve computer functionality, creating automated systems for maintaining relationships between independently stored data, utilizing unconventional combinations of technologies (e.g., vector database 148, language models, event processing, etc.) to achieve improved technical outcomes.

This holistic approach represents a significant technical improvement over conventional systems by implementing novel solutions that enhance the fundamental operation of computer systems rather than merely applying existing technology to a business problem.

Figure 2:
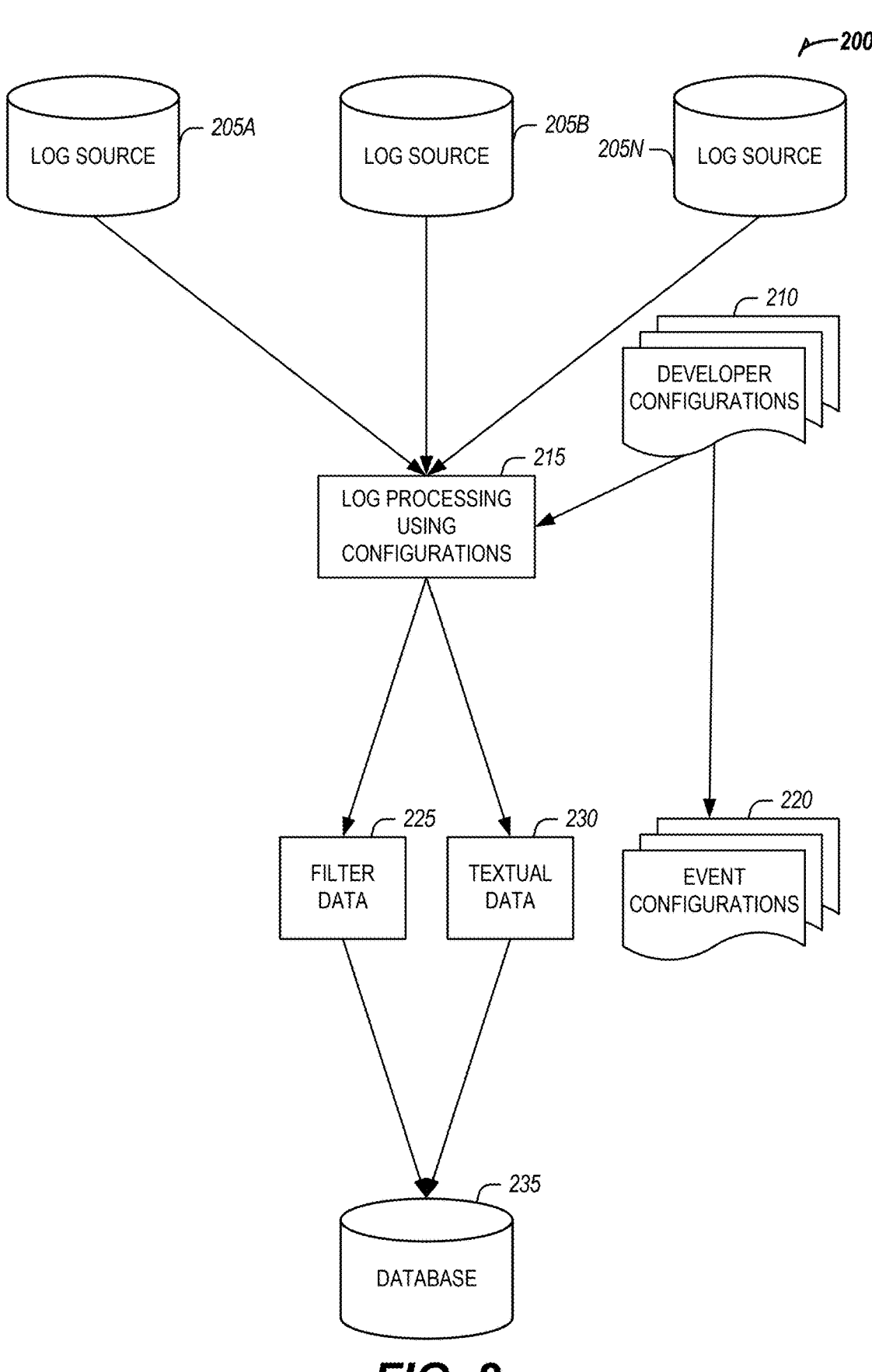
FIG. 2 illustrates a flow diagram of an example developer data flow for dynamic data log mining for issue resolution, according to an embodiment.

FIG. 2 illustrates a flow diagram of an example data flow 200 for dynamic data log mining for issue resolution, according to an embodiment.

Developers and customer service representatives interact with the platform a bit differently. Developers configure the platform for the customer service representatives via a declarative configuration that is specific to the component that they are responsible for at operation 210. Each developer can add several such configurations, and each one is responsible for a specific event. An event is defined, at operation 220, as a set of logs 205A, 205B, and 205N, that provide relevant information for the customer service representative to drive the issues to closure. Events can have one or more filters 225, for instance, a forecasting algorithm with the name "DemandDriverAlgo" for a tenant A, can have both the algorithm name and the tenant name as filters. A configuration can also combine logs from several different components to provide better context 230. For instance, an ML algorithm may pull data by running several database queries on a database and then run the ML algorithms on a cluster and then save the results back to a database 235 using some database procedures. This produces independent logs, and the logs are stored independently. However, to effectively debug any issue, the logs must be combined to provide a full description of system statuses at the time of a computing system error.

For a given configuration, the log messages are processed at operation 215 and stored in a table. Each table is marked with a description to mention what kind of information it stores and what events it can handle. Developers can provide different filters to be extracted from the event.

The logs 205A to 205N are chronologically processed and go through several steps for a developer configuration.

Start and end messages are identified in the logs 205A, 205B, and 205N. Each combination of start and end message is treated as an event by the log processor 215 using the developer configurations 210 and event configurations 220. Within the event, log statements containing reference text are filtered using filter data 225 for further processing. After the first level of basic text processing, LLMs are prompted to extract relevant information specified in a function (e.g., the function_spec portion of Table 1, etc.) to obtain textual data 230. 5. When the information is extracted, extracted filters and event logs are saved in a specific table of the database 235. Logs are also saved in the database 235 as plain text to retain all relevant information for posterity. Each developer config 210 is processed to generate an event configuration 220 to identify events matching user queries to return appropriate log data.

Figure 3:
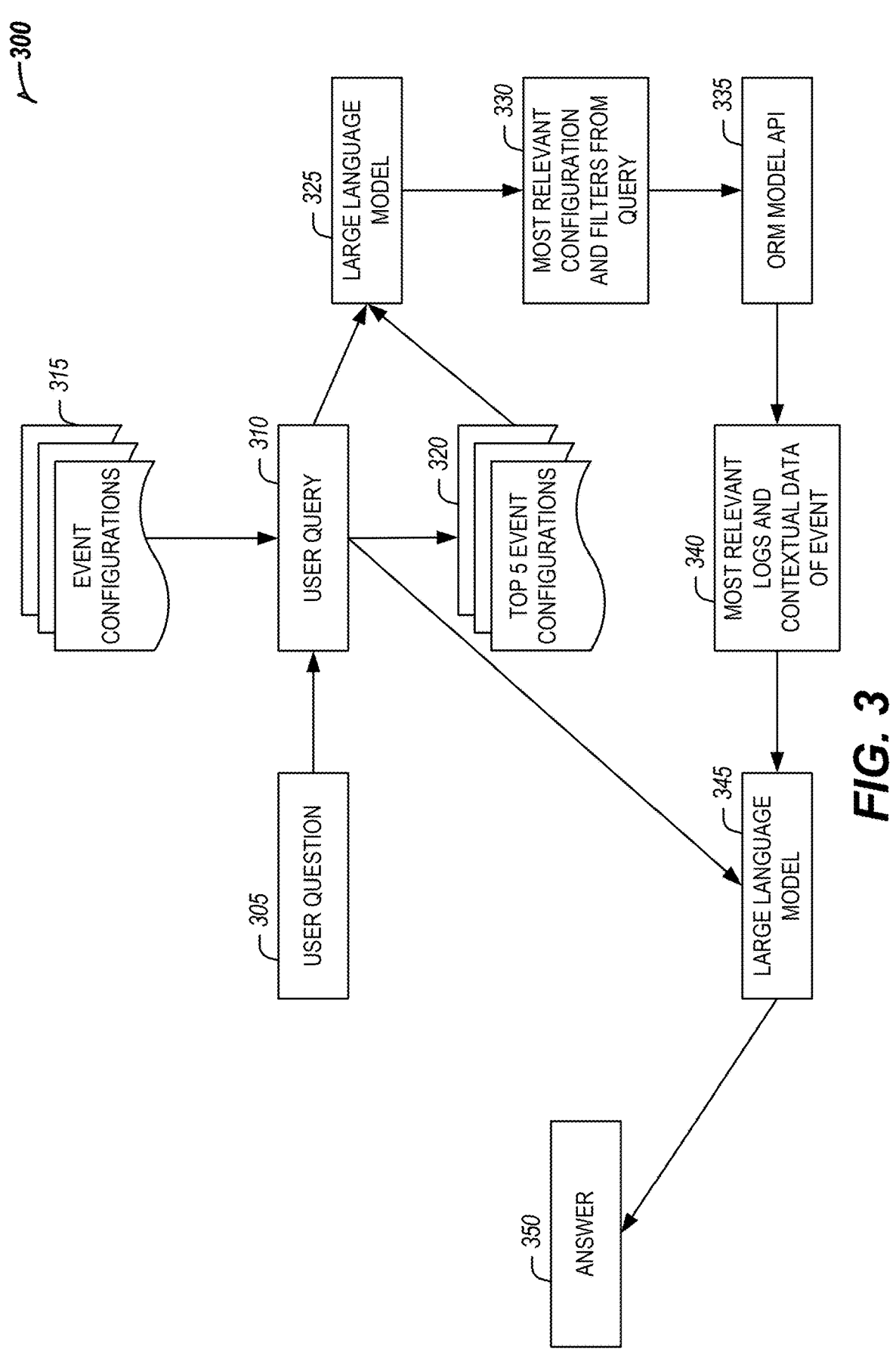
FIG. 3 illustrates a flow diagram of an example customer service data flow for dynamic data log mining for issue resolution, according to an embodiment.

FIG. 3 illustrates a flow diagram of an example customer service data flow 300 for dynamic data log mining for issue resolution, according to an embodiment.

Customer service representatives are provided with a chatbot (e.g., within the customer service interface 166 as described in FIG. 1, etc.) that allows the representative to interact with the platform. When the customer service representative enters a question 305 a user query 310 is generated (e.g., by the query generator 158 as described in FIG. 1, etc.), the user query 310 is semantically matched with one or more events using event configurations 315 that are potentially relevant. Language embeddings are used to semantically match the user query 310 to the available events corresponding to the event configurations 315.

Relevancy tables 320 are sent to an LLM 320 to pick the most appropriate table that can answer the user query 310 and extracts filters that are relevant to the table using function calling of the LLM 320 at operation 330. When the filters are extracted, a database query is generated to query the relevant table and extract the relevant logs using an ORM model API 335 to obtain the most relevant logs and contextual data for the event at operation 340. The data captured at operation 340 is sent as a prompt to an LLM 345 to return an answer 350 the question 305.

For example, a user inputs "What was the issue with DP51DemandForecat plugin on May 5th 2024?" The returned answer 350 may be output as "Your plugin DP51DemandForecat was running into memory issues on May 5th of 2024. It was run twice and the second time it failed due to memory errors whereas the first time it ran fine. It is also noted that your input data increased from 1 million rows to 2 million rows when it was run the second time, it could be one of the reasons why it ran out of memory."

Figure 4:
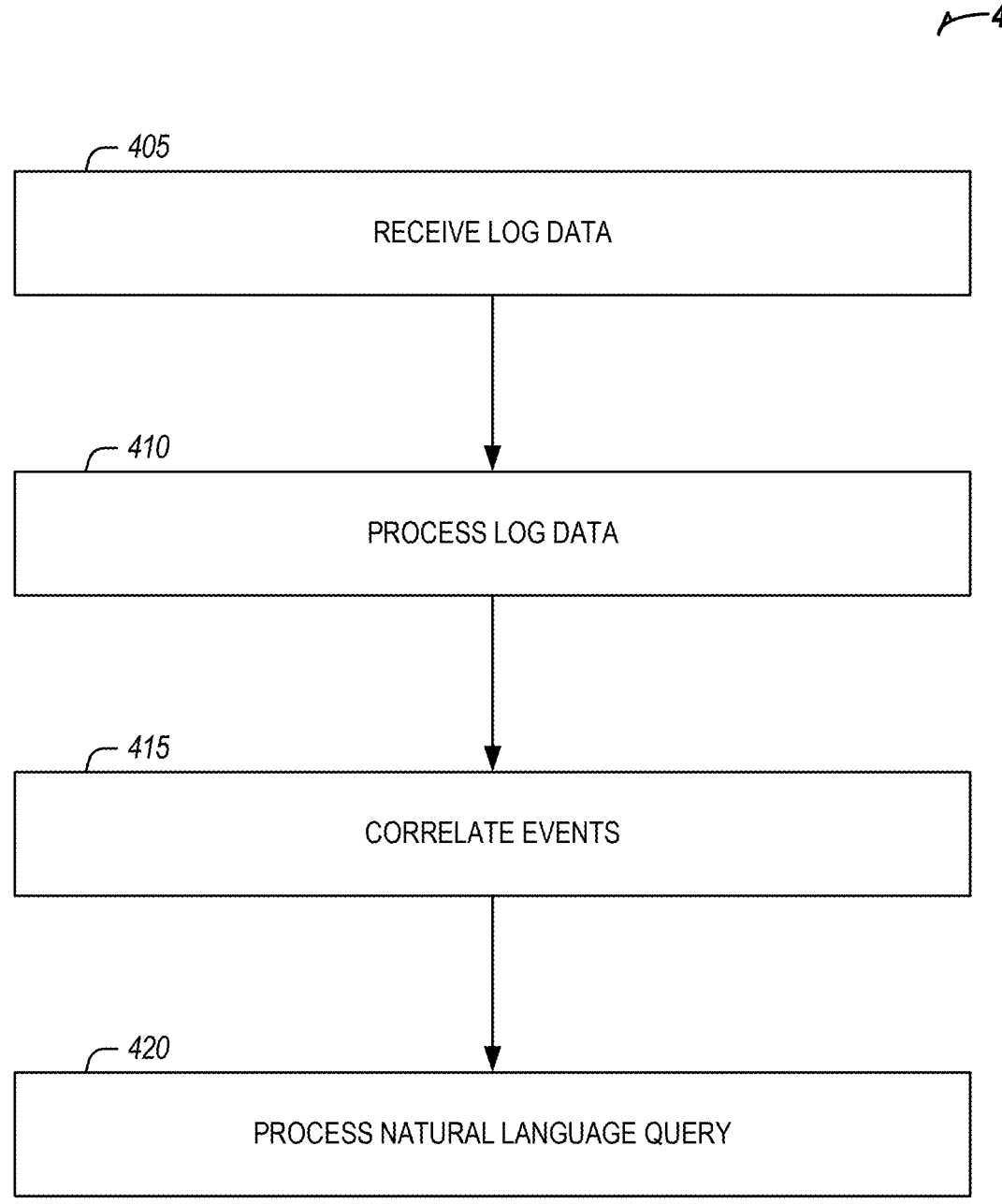
FIG. 4 illustrates an example of a method for dynamic data log mining for issue resolution, according to an embodiment.

FIG. 4 illustrates an example of a method 400 for dynamic data log mining for issue resolution, according to an embodiment. The method 400 may provide features as described in FIGS. 1 to 3.

Log data is received from a plurality of distributed software components (at operation 405). Each software component generates logs for different types of operations.

The log data is processed using developer-configured event definitions that specify start messages and end messages for identifying discrete events. In an example, tenant boundaries are validated for each log entry and tenant-specific context is maintained across the distributed software components.

The identified discrete events are correlated across the distributed software components (at operation 410). In an example, large language models are used to extract structured information based on developer-specified function parameters and chronological relationships are maintained between events across the distributed software components. Reference text patterns are extracted that are specified in the developer-configured event definitions. And relationships are identified between logs from different components based on the extracted reference text patterns and related logs are combined into unified event records. The unified event records are stored in a hybrid database structure that maintains both filtered data and complete textual context. In an example, the hybrid database structure comprises a SQL database for storing structured event data and a vector database for enabling semantic comparison of textual information.

Natural language queries are processed (e.g., at operation 415). In an example, two-stage language model processing is performed comprising first stage processing to identify relevant event types and second stage processing to extract specific filters and generate detailed responses. The queries are semantically matched to relevant stored events using language embeddings. SQL queries are automatically generated based on the semantic matching and responses are provided based on the unified event records. In an example, event configurations are automatically generated from developer-provided declarative configurations and processing rules are dynamically updated based on the generated event configurations. In an example, plain text versions of logs are maintained for historical analysis and relationships are tracked between independently stored logs across different system components.

Figure 5:
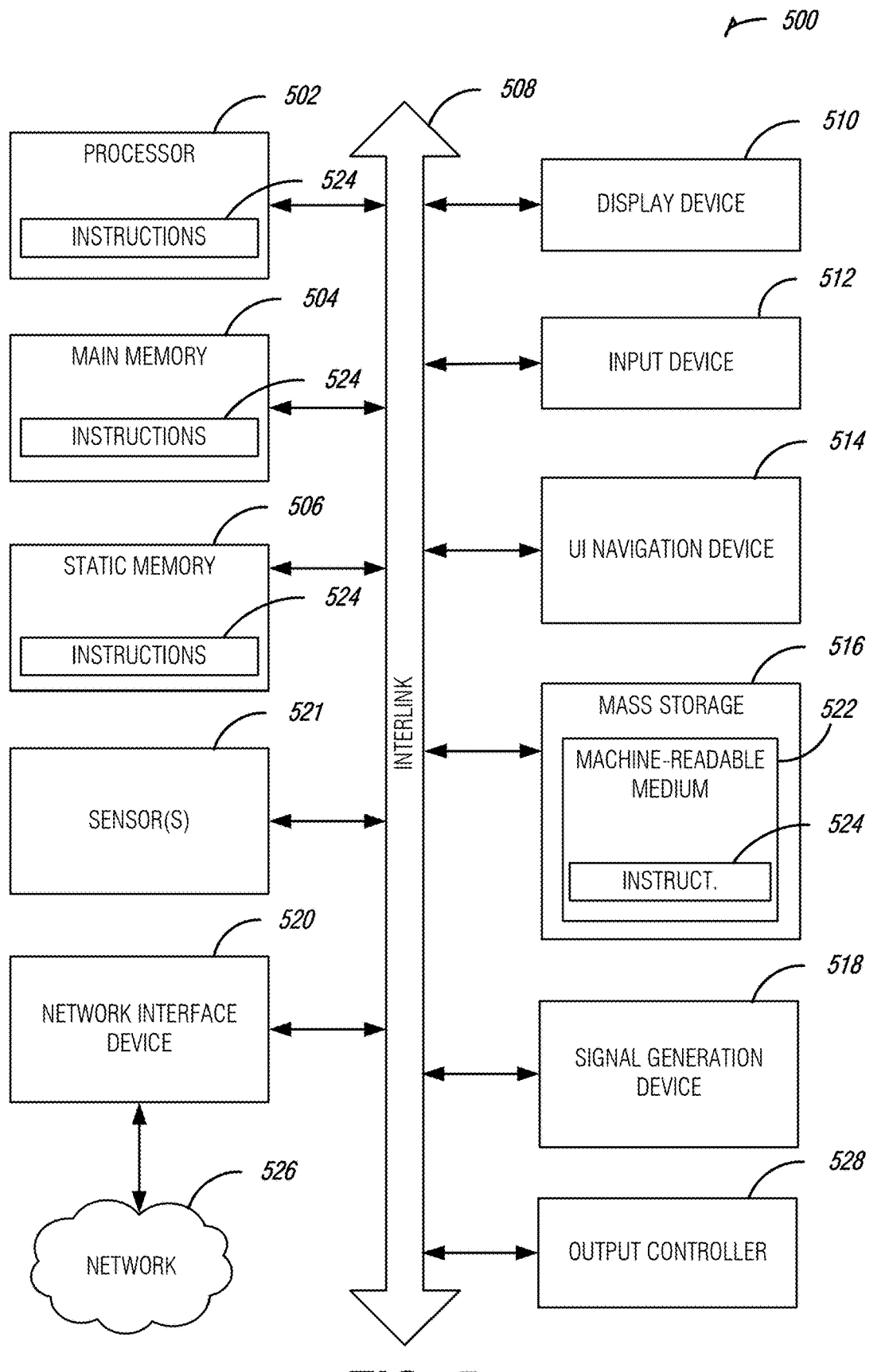
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensors. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, 3rd Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for processing log data in a multi-tenant environment, comprising:
   at least one processor;
   at least one graphics processing unit (GPU); and
   memory comprising instructions that, when executed by the at least one processor and the GPU, causes the at least one processor and the GPU to perform operations to:
   receive log data from a plurality of distributed software components, wherein each software component generates logs for different types of operations;
   process the log data using developer-configured event definitions that specify start messages and end messages for identifying discrete events;
   correlate the identified discrete events across the distributed software components by:
      extracting reference text patterns specified in the developer-configured event definitions, identifying relationships between logs from different components based on the extracted reference text patterns, and combining related logs into unified event records;
   storing the unified event records in a hybrid database structure that maintains both filtered data and complete textual context, wherein the hybrid database structure comprises a vector database configured for fast semantic comparison of log-specific textual information and to handle billions of records while maintaining quick query processing, and is integrated with SQL tables for hybrid structured/semantic querying, and wherein each unified event record is stored together with an embedding for semantic comparison; and
   process natural language queries by:
      generating a query embedding for each natural language query using a GPU-accelerated neural network;
      performing semantic matching by executing an approximate-nearest-neighbor search over a graph-based vector index using the query embedding;
      automatically generating SQL queries based on the semantic matching; and
      providing responses based on the unified event records and contextual textual data retrieved from the hybrid database structure.

2. The system of claim 1, the instructions to process the log data further comprising instructions that, when executed by the at least one processor, causes the at least one processor to perform operations to:
   validate tenant boundaries for each log entry; and
   maintain tenant-specific context across the distributed software components.

3. The system of claim 1, the instructions to correlate the identified discrete events further comprising instructions that, when executed by the at least one processor, causes the at least one processor to perform operations to:
   use large language models to extract structured information based on developer-specified function parameters; and
   maintain chronological relationships between events across the distributed software components.

4. The system of claim 1, wherein the hybrid database structure comprises:
   a SQL database for storing structured event data; and
   a vector database for enabling semantic comparison of textual information.

5. The system of claim 1, the memory further comprising instructions that, when executed by the at least one processor, causes the at least one processor to perform operations to:

automatically generate event configurations from developer-provided declarative configurations; and dynamically update processing rules based on the generated event configurations.

6. The system of claim 1, the instructions to process natural language queries further comprising instructions that, when executed by the at least one processor, causes the at least one processor to perform operations to:

perform two-stage language model processing comprising:

first stage processing to identify relevant event types, and second stage processing to extract specific filters and generate detailed responses.

7. The system of claim 1, the memory further comprising instructions that, when executed by the at least one processor, causes the at least one processor to perform operations to:

maintain plain text versions of logs for historical analysis; and track relationships between independently stored logs across different system components.

8. At least one non-transitory machine-readable medium comprising instructions for processing log data in a multi-tenant environment that, when executed by at least one processor, causes the at least one processor to perform operations to:

receive log data from a plurality of distributed software components, wherein each software component generates logs for different types of operations;

process the log data using developer-configured event definitions that specify start messages and end messages for identifying discrete events;

correlate the identified discrete events across the distributed software components by:

extracting reference text patterns specified in the developer-configured event definitions, identifying relationships between logs from different components based on the extracted reference text patterns, and combining related logs into unified event records;

storing the unified event records in a hybrid database structure that maintains both filtered data and complete textual context, wherein the hybrid database structure comprises a vector database configured for fast semantic comparison of log-specific textual information and to handle billions of records while maintaining quick query processing, and is integrated with SQL tables for hybrid structured/semantic querying, and wherein each unified event record is stored together with an embedding for semantic comparison; and process natural language queries by:

generating a query embedding for each natural language query using a graphics processing unit (GPU)-accelerated neural network;

performing semantic matching by executing an approximate-nearest-neighbor search over a graph-based vector index using the query embedding;

automatically generating SQL queries based on the semantic matching; and providing responses based on the unified event records and contextual textual data retrieved from the hybrid database structure.

9. The at least one non-transitory machine-readable medium of claim 8, the instructions to process the log data further comprising instructions that, when executed by the at least one processor, causes the at least one processor to perform operations to:

validate tenant boundaries for each log entry; and maintain tenant-specific context across the distributed software components.

10. The at least one non-transitory machine-readable medium of claim 8, the instructions to correlate the identified discrete events further comprising instructions that, when executed by the at least one processor, causes the at least one processor to perform operations to:

use large language models to extract structured information based on developer-specified function parameters; and maintain chronological relationships between events across the distributed software components.

11. The at least one non-transitory machine-readable medium of claim 8, wherein the hybrid database structure comprises:

a SQL database for storing structured event data; and a vector database for enabling semantic comparison of textual information.

12. The at least one non-transitory machine-readable medium of claim 8, further comprising instructions that, when executed by the at least one processor, causes the at least one processor to perform operations to:

automatically generate event configurations from developer-provided declarative configurations; and dynamically update processing rules based on the generated event configurations.

13. The at least one non-transitory machine-readable medium of claim 8, the instructions to process natural language queries further comprising instructions that, when executed by the at least one processor, causes the at least one processor to perform operations to:

perform two-stage language model processing comprising:

first stage processing to identify relevant event types, and second stage processing to extract specific filters and generate detailed responses.

14. The at least one non-transitory machine-readable medium of claim 8, further comprising instructions that, when executed by the at least one processor, causes the at least one processor to perform operations to:

maintain plain text versions of logs for historical analysis; and track relationships between independently stored logs across different system components.

15. A computer-implemented method for processing log data in a multi-tenant environment, comprising:

receiving log data from a plurality of distributed software components, wherein each software component generates logs for different types of operations;

processing the log data using developer-configured event definitions that specify start messages and end messages for identifying discrete events;

correlating the identified discrete events across the distributed software components by:

extracting reference text patterns specified in the developer-configured event definitions, identifying relationships between logs from different components based on the extracted reference text patterns, and combining related logs into unified event records;

storing the unified event records in a hybrid database structure that maintains both filtered data and complete textual context, wherein the hybrid database structure comprises a vector database configured for fast semantic comparison of log-specific textual information and to handle billions of records while maintaining quick query processing, and is integrated with SQL tables for hybrid structured/semantic querying, and wherein each unified event record is stored together with an embedding for semantic comparison; and processing natural language queries by:

generating a query embedding for each natural language query using a graphics processing unit (GPU)-accelerated neural network;

performing semantic matching by executing an approximate-nearest-neighbor search over a graph-based vector index using the query embedding;

automatically generating SQL queries based on the semantic matching; and providing responses based on the unified event records and contextual textual data retrieved from the hybrid database structure.

16. The method of claim 15, wherein processing the log data further comprises:

validating tenant boundaries for each log entry; and maintaining tenant-specific context across the distributed software components.

17. The method of claim 15, wherein correlating the identified discrete events comprises:

using large language models to extract structured information based on developer-specified function parameters; and maintaining chronological relationships between events across the distributed software components.

18. The method of claim 15, wherein the hybrid database structure comprises:

a SQL database for storing structured event data; and a vector database for enabling semantic comparison of textual information.

19. The method of claim 15, further comprising:

automatically generating event configurations from developer-provided declarative configurations; and dynamically updating processing rules based on the generated event configurations.

20. The method of claim 15, wherein processing natural language queries comprises:

performing two-stage language model processing comprising:

first stage processing to identify relevant event types, and second stage processing to extract specific filters and generate detailed responses.

* * * * *